United States Patent [19]
Wischermann

[11] Patent Number: 5,148,278
[45] Date of Patent: Sep. 15, 1992

[54] FILTER CIRCUIT OF THE MEDIAN TYPE FOR VIDEO SIGNALS

[75] Inventor: Gerhard Wischermann, Weiterstadt, Fed. Rep. of Germany

[73] Assignee: BTS Broadcast Television Systems GmbH, Darmstadt, Fed. Rep. of Germany

[21] Appl. No.: 640,102

[22] Filed: Jan. 11, 1991

[30] Foreign Application Priority Data

Jan. 20, 1990 [DE] Fed. Rep. of Germany ....... 4001552

[51] Int. Cl.[5] .................. H04N 5/14; H04N 5/208
[52] U.S. Cl. ................................ 358/167; 358/166
[58] Field of Search ............... 358/36, 213.15, 167, 358/166, 136, 31; 455/307; 382/52

[56] References Cited

U.S. PATENT DOCUMENTS

| | | | |
|---|---|---|---|
| 4,573,070 | 2/1986 | Cooper | 358/36 |
| 4,661,853 | 4/1987 | Roeder et al. | 358/36 |
| 4,682,230 | 7/1987 | Perlman et al. | 358/167 |
| 4,720,745 | 1/1988 | DeForest et al. | 358/37 |
| 4,736,439 | 4/1988 | Hay | 358/167 |
| 4,782,389 | 11/1988 | Maymeather, III | 455/307 |
| 4,800,511 | 1/1989 | Tanaka | 358/167 |
| 4,989,090 | 1/1991 | Campbell et al. | 358/11 |

FOREIGN PATENT DOCUMENTS

| | | |
|---|---|---|
| 0227848A1 | 7/1987 | European Pat. Off. . |
| 0246878A2 | 11/1987 | European Pat. Off. . |
| 56-46371 | 4/1981 | Japan ........... 358/167 |
| 2202706 | 9/1988 | United Kingdom . |

OTHER PUBLICATIONS

IEEE Transactions on Communications, vol. Com-35, No. 6, Jun., 1987, "Adaptive Median Filtering for Impulse Noise Elimination in Real-Time TV Signals", S. Perlman, pp. 646-652.

IEEE Transactions Consumer Electronics, vol. 34, No. 1, Feb., 1988, "A VLSI Median Filter for Impulse Noise Elimination in Composite or Component TV Signals", L. A. Christopher, pp. 262-267.

Signal Processing (1989) 217-224, "A Variable Median Filter for Image Restoration Adaptable to Different Types of Spike Noise", R. Kutka, pp. 217-224.

Digitale Bildverarbeitung, by Peter Haberacker, published by Carl Hanser Verlag in 1989, pp. 139-142.

Primary Examiner—Michael Razavi
Assistant Examiner—Wendy R. Greening
Attorney, Agent, or Firm—Frishauf, Holtz, Goodman & Woodward

[57] ABSTRACT

For filter video signals a median selector is used to the inputs of which the sample values of a first pixel and other neighboring pixels. These other pixels lie in the line direction (horizontal) and in a direction perpendicular thereto (vertical) next to the first pixel. The filtering is improved if at least one additional pixel is provided in each of those directions, providing a cruciform filter window. A still further improvement is provided if pixels which immediately preceed or follow the first pixel in the time-dimension (i.e. pixel values from a previous or following picture) are also supplied to the median selector. By utilizing interpolated sub-pixels close to the central or first pixel, disturbances, not only from noise or drop-out, but also from chrominance cross-talk, can be mitigated or avoided.

6 Claims, 2 Drawing Sheets

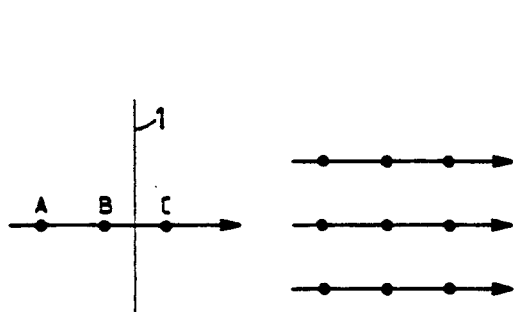
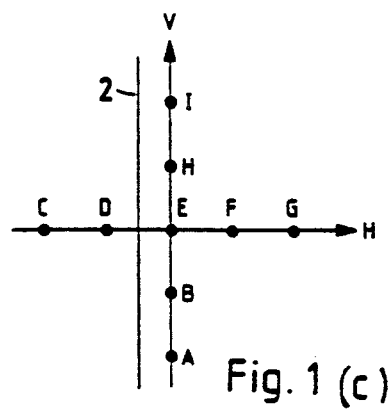
Fig. 1 (a)  Fig. 1(b)  Fig. 1 (c)
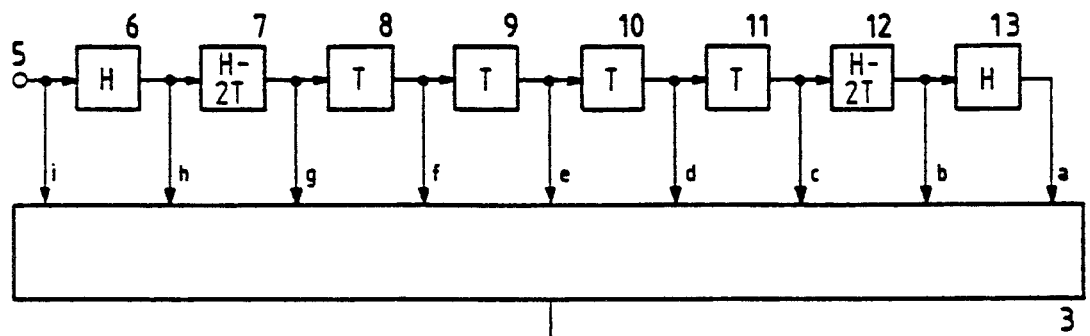
Fig. 2
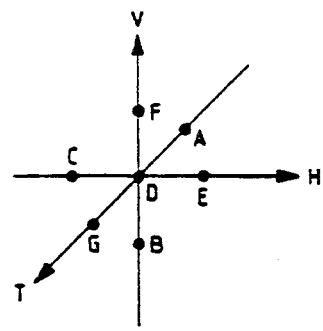
Fig. 3
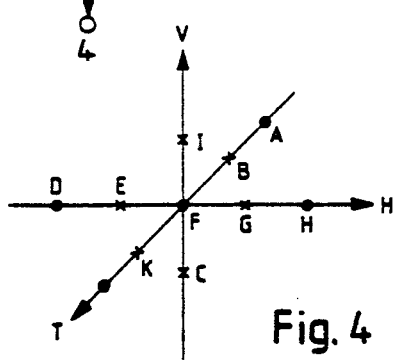
Fig. 4
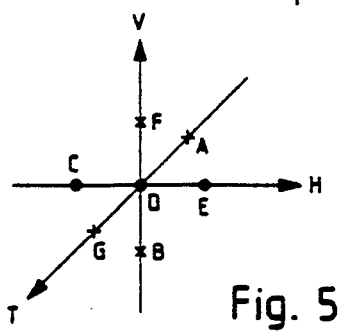
Fig. 5

FILTER CIRCUIT OF THE MEDIAN TYPE FOR VIDEO SIGNALS

This invention concerns a video signal filter, especially for filtering out speck type disturbances in the picture content, Which uses the principle of substituting for a speck-like feature the value of one pixel of a group of pixels neighboring the suspected speck, the pixel whose value is the median value of the group of pixels.

BACKGROUND AND PRIOR ART

In the processing of video signals various kinds of filters are used in order to smooth out undesired signal components (disturbing signals) or to separate different components of a useful signal from each other. Low-pass, high-pass and band-pass filters are used, among others. Other filters, such as comb filters, for example, are especially suited for the spectrum of video signals arising from the line-by-line and picture-by-picture scanning or sampling that is available in television. The quantization of video signals arising from the time-wise (picture-by-picture) and vertical (line-by-line) sampling and also by horizontal sampling resulting from analog to digital conversion is observable in corresponding structures visible in the outputs of known digital filters for video signals.

The use of so-called median filters for digital video signals, already briefly referred to above, is also already known. Thus for example in British Patent 2 202 706 A there is described a video signal processing circuit for suppression of disturbing pulses which are produced by the scanning of dirty films. For this purpose corresponding video signal pixels of several successive pictures are supplied to a median selector. In addition to a corresponding signal of a picture from the middle of the sequence, there are also neighboring pixel values supplied from the middle picture to the median selector, in order to compensate for a change of picture content of the previous and of the following picture which is produced by motion. In the disclosure of that British patent, however, it is not undertaken to fit the filter constituted by the median selector to any peculiar properties of the video signals or to dominant structures of television pictures.

The use of median filters for video signals is further described in the book "Digitale Bildverarbeitung" by P. Haberecker, third revised addition, published by Hanser Verlag in 1989. Among other things there is mentioned there a two dimensional filter of which the structurerizing element—referred to hereinafter as a window—is cross-shaped. Both of the above-mentioned known filter circuits are proposed for suppression of transient disturbing pulses essentially affecting a single picture element (pixel). In these cases there still remains the problem of the difficulty of distinguishing, from each other, disturbing pulses and high frequency portions of the useful signal.

SUMMARY OF THE INVENTION

It is an object of the present invention to provide a system or apparatus for filtering video signals which takes advantage of the characteristic properties of video signals, to a great extent removes disturbance signals, and leaves the useful signal substantially unimpaired. In achieving these results, the object of the invention is, in the first place, to suppress disturbing signals which occur most often in video signals that are received from a television broadcast or by reproduction from video tape or other records. Such disturbances are mostly distributed over a wide frequency range (noise) or else stray residues of other useful signals (color carrier), the amplitudes of which are rather small compared to the amplitude of the useful signal.

Briefly, the sample values of a first pixel and of additional pixels are made available to the inputs of a median selector and the additional pixels in question lie adjacent to the first pixel in the line direction (horizontally) and perpendicularly to the line direction (vertically). For example either two or four neighboring pixels in each of those directions can be usefully used for the additional pixels.

The filter of the invention has the advantage that objects of the invention are fulfilled with relatively simple means. There is a further advantage that the circuit of the invention can easily be adapted to a wide variety of applications.

The filter circuit of the invention takes account in an advantageous way of the fact that horizontal and vertical edges appear frequently in television pictures and that their clear reproduction is particularly important.

It is particularly advantageous to provide, in the filter of the invention, for compensation of signal dropouts and for suppression of adjacent channel cross-talk between chrominance and luminance signals in the well known color television systems (PAL, NTSC).

BRIEF DESCRIPTION OF THE DRAWINGS

Further details of the invention will best be understood with examples illustrated in the annexed drawings, in which:

FIG. 1(a) is a schematic representation of those pixels of which the sample values are respectively supplied during a scanning period of the median selector in the case of one already known circuit;

FIG. 1(b) is a schematic representation of those pixel elements of which the sample values are respectively supplied during a scanning period to the median selector in the case of a second known circuit;

FIG. 1(c) is a schematic representation of those pixel elements of which the sample values are respectively supplied during a scanning period to the median selector in the case of an embodiment of the invention;

FIG. 2 is a block circuit diagram of a filter circuit for the embodiment explained with reference to FIG. 1(c).

FIG. 3 is a schematic representation of a second illustrative embodiment of the invention;

FIG. 4 is a schematic representation of a third illustrative embodiment of the invention in which supplementary interpolation values are supplied to the median selector;

FIG. 5 is a schematic representation of an embodiment of the invention for suppression of color crosstalk.

DESCRIPTION OF THE ILLUSTRATED EMBODIMENTS

Figure 6:
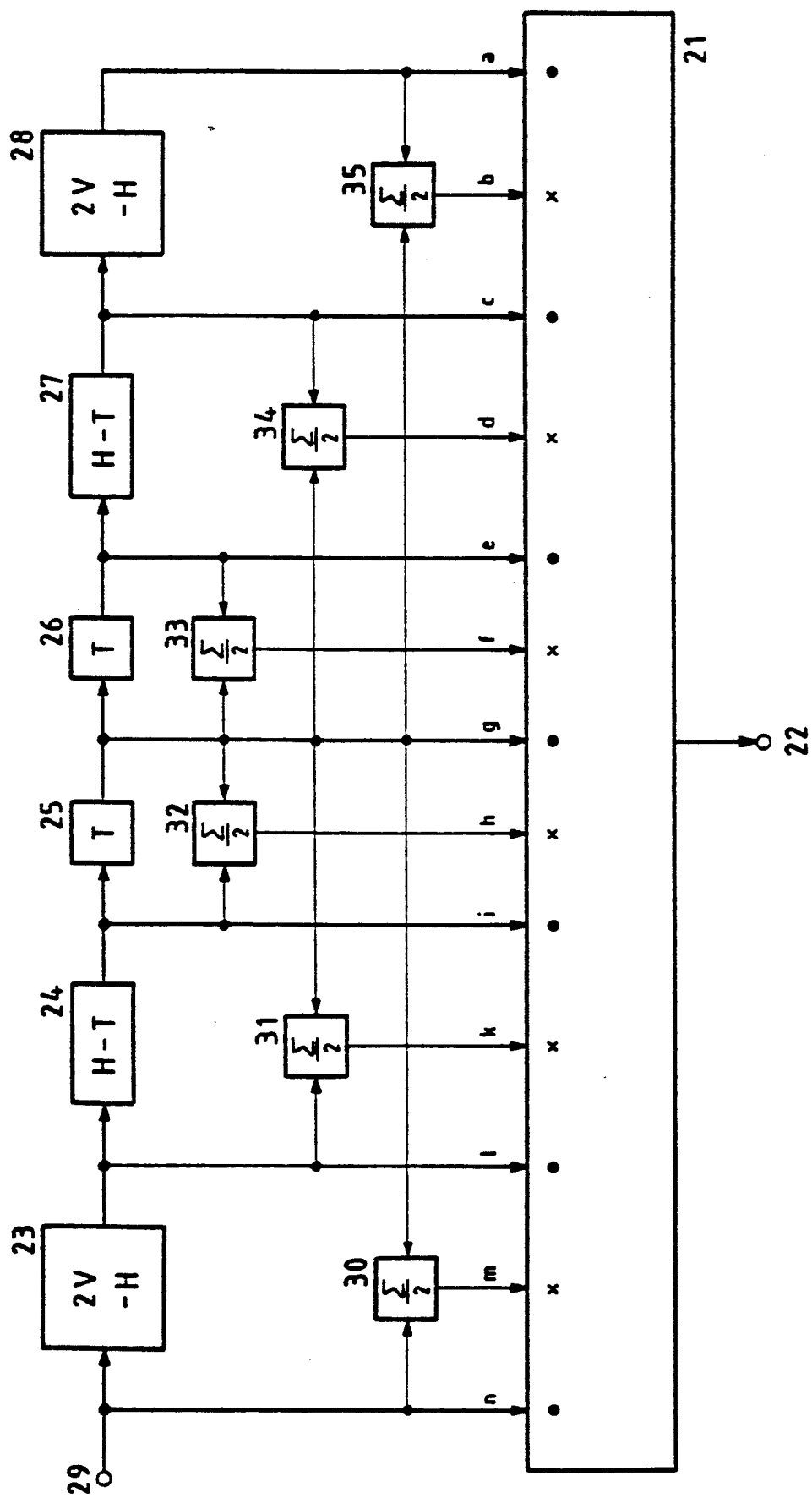
FIG. 6 is a block circuit diagram of still another embodiment of the invention.

FIG. 1(a) shows three pixels A, B and C on a horizontal line which carries an arrowhead at the right to indicate that the scanning proceeds in that direction, designated H. When a median selector is supplied with these pixels, the output provides the pixel value of mid-rank selected from the values of the three pixels. If for example the video signal is passing through a vertically running edge 1 of very short rising time, the values of the pixels A and B might be 100% (white) and the value of the pixel C might be 0% (black). The two extreme values, one black and one white, are not passed on by the median selector, so that a pixel value designating white remains as the mid-rank pixel. One sampling interval later the sample values of the pixels B, C and another pixel just to the right of them are supplied to the median selector, two of them now representing black and one white. The output of the median selector is then a pixel value representing black. From this example it can be seen that such an edge is reproduced without smearing.

In the case of a video signal which is originally constant but which is overlaid with random disturbances, the latter are reduced by being held down by the extreme values supplied to the median selector. The same holds for a transient disturbance pulse which is not transmitted to the extent that it extends over less than half of the pixels brought into considertion for median filtering.

In another type of median filter for video signals there is a square rather than a linear window. This is illustrated in FIG. 1(b). For vertical structures such as vertically running edges, such median filtering does not have any additional peculiarities compared to the one-dimensional window described in FIG. 1(a). Median filtering as described in connection with FIGS. 1(a) and 1(b) are already known in the art.

FIG. 1c illustrates the case of a two-dimensional median filter in accordance with the invention. The central pixel which is subject to replacement is the pixel E. There are two pixels A and B beneath the central pixel, two H and I above the central pixel, two pixels C and D to the left and two to the right, all of which are to be taken into account. In this way structures which include vertical and/or horizontal edges can be transmitted through the filter in a manner that suppresses disturbances to a great extent. If for example an edge 2 is at the left of the central pixel E the mid-rank sample value of the pixels A, B and E to I is transmitted as the amplitude value for the pixel E. In this case there are enough values present in the luminance region to the right of the edge 2 to produce the result that after the elimination of the sample values C and D lying to the left of the edge and of 2 other values lying at the opposite end of the entire amplitude region under consideration, there remain enough values to produce diminution of random disturbances by finding and substituting a mid-rank value from the aforesaid remainder of pixel values. A further explanation of the embodiment having the characteristics described in connection with FIG. 1(c) is provided by the example of an undisturbed horizontal sinusoidal signal that corresponds to vertical stripes on the picture screen. In this case the sample values of the pixels A, B, E, H and I have the same magnitude, while the pixels C, D, F and G can have various sample values. As a result the median value is necessarily at the sample value of the pixel E, the central pixel. The same holds for purely vertical sinusoidal signals, since the sample values of the central pixel E likewise appears five times. If the useful signal is overlaid by noise, the median selector selects from the five now approximately equal pixels, the one with the smallest noise amplitude.

In the case of diagonal amplitude cycles, all of the pixels of the window have different amplitudes. The median value then provides, in general, an average (damped) signal value.

FIG. 2 shows an illustrative example of a circuit for the filter described with reference to FIG. 1(c). The median selector 3 consists of a digital signal processor shown in the example of FIG. 2, as having 9 inputs a-i. The mid-rank value is passed on to its output 4. That result can be accomplished simply, for example by sorting all of the values sequentially in accordance with their magnitude and then selecting for passing on only the fifth one of the values so ranked (thus the median value among the considered values).

In FIG. 2 the video signal to be filtered is supplied to an input 5 and is then delayed in successive delay units 6 to 13, so that at each time of sampling, a central pixel will be at an input e and while the other pixels shown in FIG. 1(c) would be supplied to the other inputs of the median selector 3. For this purpose, from the middle input e, a time difference of a sampling interval T is necessary with respect to the inputs f and d and likewise a further time difference of a sampling interval T to the inputs g and c. That takes account of the pixels disposed horizontally next to each other.

For the sample values of the pixels B and H the inputs b and h are provided. The delay times of the corresponding delay units 7 and 12 are each equal to a line period less two sampling intervals, since the delay between the pixels B and E and between A and H is in each case a line period. Two delay units 6 and 13 each have the delay time of a single line period H, so that the sample values of all the pixels A to I of the window are present simultaneously at the inputs a to i of the median selector.

In circuits for digital processing of video signals in which digital memories, for example picture memories, are present already, it is possible in a simple way to constitute the delay units 6 to 13 by reading out the sample values from a memory under different addresses. A further improvement of the circuit apparatus of the invention is possible by bringing into consideration pixels of preceding or following pictures having corresponding picture positions. For example, in FIG. 3 a filter window is shown in which there are provided, along with the central pixel D the pixels of a filter window which extends in vertical, horizontal and time dimensions to include the neighboring pixels A, B, C, E, F and G. According to the requirement of the particular case in 1, 2 or all directions is also possible to take into account more than three neighboring pixels. By the introduction of the sample values from neighboring full pictures (frames) into the median filter process, disturbances and resolution losses affecting diagonal structures can be to a great extent suppressed or even eliminated from quiescent picture content.

In FIG. 3 the central pixel D is processed with respect to two neighboring pixels in each sampling direction, picture sequence time being one of the sampling directions. This isometric arrangement of the window produces a well balanced adaptive median filtering with respect to the spatial and temporal activity of the video signal.

If a probability of 100 percent is defined for a "correct" median value, this is fulfilled when at least half of the pixels are identical. The probability for a correct median value thus works out to be $W=2 \cdot I/n$. In the foregoing expression I designates the number of identical pixels and N the total number of pixels in the window.

N=7 for the window illustrated in FIG. 3. When there is purely horizontal or purely vertical activity there are five identical pixels, so that the probability W=10/7, which exceeds 100%, so that there is no deterioration of the vertical or horizontal structures.

For unlimited horizontal and vertical activities, therefore also in the case of diagonal structures, there are three identical pixels for quiescent pictures, so that the probability for a correct median value is W=6/7 which is less then 100%. In contrast thereto, in two dimensional filtering with N=7 there is a probability of a correct median value of W=2/7 when the third and neglected dimension has identical values. There is therefore a significant improvement when three dimensional filtering is substituted for two dimensional median filtering with reference to suppression of so-called alias effects resulting from the presence of diagonal structures in the picture content.

Even in the case of activity of the picture content in horizontal, vertical and time directions, there is, for a single indentical pixel, still the correctness probability of W=2/7. In that case, however, there are moving scenes, fine diagonal structures alias effects and losses of sharpness appear, which nevertheless are partly concealed by the natural sharpness of movement and are visible only under extreme conditions, for example in the case of strong contrast.

The following investigation of the gain in margin against disturbance is based on the assumption that a negative effect on the signal should take place only in the case of rare (extreme) picture content. It can be determined, on the basis of a so-called white noise distribution, that the improvement in margin against disturbance is somewhat proportional to the window size of the median filter. The subjective improvement of margin against disturbance is, however, dependent on the spectral distribution of noise, since the eye responds more greatly to low frequency noise than to high frequency noise. In consequence there is a substantial superiority of the three dimensional filter with respect to two dimensional filtering at the same window size, since the supplemental time-wise filtering suppresses the low frequency noise components. The design of the window in the horizontal, vertical or time-wise direction can be varied to suit the spectral distribution of noise in the particular case. Basically a greater window in any direction leads to greater suppression of the noise components.

A three dimensional median filter according to the invention is suited not only for attenuation of random noise, but also for suppression of signal drop-outs which can occur on a recording carrier such as magnetic tape. Preferably a filter can be used for this purpose in which in each direction, in addition to the central pixel, the two neighboring pixels are taken into account, as shown in FIG. 3. This median filter is capable, for example, of completely suppressing picture disturbances having a duration, for example, of a line.

If it is assumed that the disturbed line (C, D, E) is recognized by an extreme luminance difference to the vertical and temporal neighborhood the median value will lie between the sample values of the pixels A, B, F and G. The median filter thus provides error concealment and in so doing operates in a self-adapting manner. In other words, no external control signal is necessary for switching the error concealing system in or out in this type of error concealment. In particular it is advantageous not only to compensate by this system not only the signal drop-outs that arise at the time of reproduction, but also signal drop-outs that already appear at the time of recording. In the application of the filter circuit of the invention for compensating for signal drop-outs no interpolation values of various pixels should be used in the vertical and time-wise direction, since that would spread the disturbance in the vertical and time-wise directions. Such an extension or elaboration of the invention is illustrated schematically in FIG. 4, where the sub-pixels are designated by crosses. The size of the window is N=11. B, C, E, G, I and K have the values obtained by interpolation by the central pixel F and in each case the nearest neighboring pixel. These sub-pixels thereby have a correlation to the central pixel, as a result of which alias disturbances are no longer visible for any directional and time-wise frequencies. In the case of quiescent pictures the five identical values A, B, F, K, L in the time-wise direction are responsible for good elimination of low-frequency disturbing signals.

With the introduction of the sub-pixels, however, the degree of noise reduction is reduced, since by the interpolation the noise components are likewise correlated and these are accordingly no longer suppressed so effectively. The number of subpixels is therefore to be determined by balancing against each other the significances and magnitudes of noise reduction and residual alias reduction.

The embodiment illustrated in FIG. 5 is one that serves for suppression of a color cross-talk into the luminance signal obtained by decoding an NTSC signal. For that purpose it is necessary to use sub-pixels interpolated in the vertical and time-wise directions. The NTSC color carrier, on account of its half line offset to the horizontal frequency has in neighboring lines and in neighboring full pictures and offset of 180°. That means that the interpolated values at the input of the median selector already have been freed of any residual chrominance.

Compared to the conventional comb filtering with line or full picture delay, the median filter again has the advantage of self-adaptation to the video signal, since the signal spectrum is shifted according to whether the predominant activity is spatial or time-wise.

In FIG. 5, instead of the sample values of two pixels C and E two interpolation values could also be provided which are obtained respectively from two sample values in which the color carrier phase is off-set by approximately 180° at a sample rate of 13.5 MHz the phase difference of the NTSC color carrier is about 190° after, for example, two sample intervals. Such a median filter combines the advantages of a line comb filter a full picture comb filter and a low-pass filter, since in the case of the median filter the output value is always to be found in the collection of similar input values.

The median filter is suited not only for suppression of the chrominance cross-talk, but also for separation of the luminance signal from the composite color television signal. For this purpose it is advantageous to replace the central pixel D, (FIG. 5) by an interpolated value. The suppression of chrominance cross-talk by means of the three-dimensional median filters can also be carried out on PAL signals, in which case attention must be given to the fact that because of the quarter line offset of the PAL color carrier, the interpolation values must be obtained from pixels delayed by two line intervals or by two full picture intervals. The filter apparatus of the invention described in connection with FIG. 6 is also applicable to the suppression of luminance crosstalk in the chrominance channel, because as a result of the Y/C signal separation and demodulation, the color difference signals are present again in the base-band. In digital component technology the chrominance signals are converted from analog into digital form at only half of the sampling frequency provided for the luminance signal. It must therefore be taken into account that in the case of horizontal interpolation of the sub-pixels the color carrier phase in the case of an NTSC signal advances by 190° within a single sampling interval.

FIG. 6 shows an illustrative example of the filter circuit of the invention in which a window can be provided that comprises, in every direction from a central pixel F, a sample value and an interpolation value, for a median selector 21 having an output 22 and 13 inputs a to n. Corresponding delays 23-28 are provided for the video signal supplied at the input 29. The circuits 30-35 provide the interpolation.

Although the invention has been described with reference to particular illustrative embodiments, it will be recognized that modifications and variations are possible within the inventive concept.

I claim:

1. A filter circuit for video signals of the median selector type comprising, in addition to a median selector provided for selecting a median pixel from a group of simultaneously presented pixels, a digital processing circuit having an input, having a chain of delay units and having a multiplicity of outputs, said outputs being separated from each other by at least one delay unit of the chain and connected for simultaneously presenting at said outputs, respectively, pixel values successively received at predetermined intervals, said digital processing circuit also having interpolation summing circuits respectively connected between at least two pairs of said outputs for supplying interpolated pixel values at additional outputs, said delay units and interpolating circuits being respectively of delay times and of interpolating connections selected for simultaneously presenting to said median selector, in addition to the value of a first pixel to be processed by said median selector, values obtained by interpolation between said value of said first pixel to be processed and, respectively, two nearest neighboring pixels in the vertical direction and two nearest neighboring pixels in the timewise direction.

2. The filter circuit of claim 1, wherein said delay units and interpolation summing circuits are of delay times and of interpolating connections selected for presenting to said median selector, simultaneously with the value of said first pixel to be processed, the values of two nearest neighboring pixels in the horizontal direction and two said interpolation values obtained in the horizontal direction, the values of two nearest neighboring pixel in the vertical direction and values of two nearest neighboring pixels in the time-wise direction.

3. The filter circuit of claim 1, adapted for suppression of chrominance cross-talk in a luminance signal derived from a color television signal according to the NTSC standard, wherein said interpolation summing circuits have connections for presenting to said median selector simultaneously with said value of said first pixel to be processed, two interpolation values obtained in the vertical direction and two interpolation values obtained in the time-wise direction.

4. The filter circuit of claim 3, wherein said two interpolated pixel values obtained in the horizontal direction are derived from pixel values in which the color carrier phase of one is 180° offset from the color carrier phase of the other.

5. The filter circuit of claim 1, characterized in that said filter circuit is connected to components of video apparatus for playback from a record carrier and is therefore capable of being relied on for compensation of signal drop-outs in video signals which are reproduced from a record carrier.

6. The filter circuit of claim 1, characterized in that, for the purpose of separating the luminance component from a color television signal, an additional interpolation summing circuit is provided having connections for obtaining by interpolation a value that is substituted for the value of said pixel to be processed and as such is furnished to said median selector.

* * * * *